United States Patent [19]
Frisch et al.

[11] 3,830,536
[45] Aug. 20, 1974

[54] HEAD CLOSURE MECHANISM
[75] Inventors: Erling Frisch, Pittsburgh; Harry N. Andrews, Export; Phillip B. Haga, Pittsburgh, all of Pa.
[73] Assignee: Westinghouse Electric Corporation, Pittsburgh, Pa.
[22] Filed: Sept. 13, 1971
[21] Appl. No.: 179,645

[52] U.S. Cl............. 292/256.73, 176/87, 220/55 R
[51] Int. Cl........................................... E05c
[58] Field of Search . 292/251, 256, 256.67, 256.73; 52/224; 176/87; 85/1 L, 1 T, 42; 220/3, 44, 55 D, 46 R, 46 MS

[56] References Cited
UNITED STATES PATENTS
947,975   2/1910   McComb........................... 85/1 L X
3,554,868   1/1971   Thorp.............................. 176/87 X
3,707,107   12/1972   Bieri.................................... 85/1 T

*Primary Examiner*—Richard E. Moore
*Attorney, Agent, or Firm*—J. R. Campbell

[57] ABSTRACT

For the purpose of reducing the time required for removal and replacement of a reactor pressure vessel closure head, each stud utilized for securing the head on the pressure vessel is provided with modified breechblock threads at its lower end. After being unloaded, the studs are rotated 60° for disengagement from corresponding threads in a flange at the top of the pressure vessel and can be lifted out of the stud holes in the vessel flange along with the head when it is removed from the vessel. Each stud is provided with an individual hydraulic tensioning device, mounted on top of the head flange.

12 Claims, 6 Drawing Figures

PATENTED AUG 20 1974

HEAD CLOSURE MECHANISM

CROSS REFERENCE TO RELATED APPLICATION

This application relates to an application, Ser. No. 53,198 entitled "Hydraulic Head Closure Mechanism" filed July 8, 1970 by Erling Frisch and Harry N. Andrews and assigned to the Westinghouse Electric Corporation.

BACKGROUND OF THE INVENTION

This invention relates, generally, to pressure vessels and, more particularly to mechanism for securing and releasing the closure heads for nuclear reactor vessels.

Heretofore, the closure heads of large nuclear power reactors have been secured to the pressure vessel by a large number of studs which are threaded into the vessel flange and extend through corresponding holes in the head flange. The necessary loading on the studs has been achieved by hand tightening of the upper nuts while the studs are being preloaded by portable hydraulic tension devices. Three tensioning devices are usually provided for each plant. They are applied to the studs in a prearranged sequence until all studs are equally stressed. This requires individual tensioning of each stud at least twice.

In order to remove the closure head for refueling, the studs must be tensioned until the nuts become unloaded and can be backed off by hand. Following this, all nuts and studs are completely removed and stored before the closure head is lifted off and refueling operations commenced.

In view of the fact that a typical large reactor vessel is provided with 56 studs, each seven inches in diameter, considerable time is required to remove the closure head after shut down and to replace it after refueling. In view of the high cost per day of shutdown of a large plant, it is desirable to reduce the time required for the refueling operation.

One means of achieving such reduction is described in the aforesaid copending application in which the holding studs are replaced by a smaller number of bolts located in radial slots in vessel and head flanges. All bolts are provided with individual hydraulic tensioning and tilting devices, permanently located on the head flanges, for the purpose of preloading the bolts and tilting the bolt heads out of the slots to permit lifting and replacement of the closure head without removal of the bolts. One disadvantage of the mechanism described in the aforesaid application is that the vessel and closure head flanges must be increased in size because of the required slotting of the flanges. Although the feasibility of fabricating the larger flanges has been established, they represent a considerable increase in the cost of producing the pressure vessel and the closure head. The larger flanges also make the vessel and the head more difficult to handle during shipping.

SUMMARY OF THE INVENTION

In accordance with the present invention, the size of the flanges, and consequently, the cost of the pressure vessel and the closure head is reduced by the use of studs, attached to the pressure vessel flange by a modified breech-block structure, in place of the bolts utilized in the mechanism described in the aforesaid application. After being unloaded hydraulically, the studs are rotated 60° to disengage the modified breechblock threads on the studs from corresponding threads in the vessel flange. The studs are then lifted out of the stud holes when the closure head is removed. The provision of flanges having radial slots therein, required with the prior mechanism, is thus avoided and, equally important, the studs are located closer to the main vessel seal, thereby reducing the force moment on the flanges. Additional cost reduction and simplification are realized by the omission of the hydraulic tilting actuators provided with the prior mechanism.

BRIEF DESCRIPTION OF THE DRAWINGS

For a better understanding of the nature of the invention, reference may be had to the following detailed description, taken in conjunction with the accompanying drawings, in which.

DESCRIPTION OF THE PREFERRED EMBODIMENT

Figure 1A:
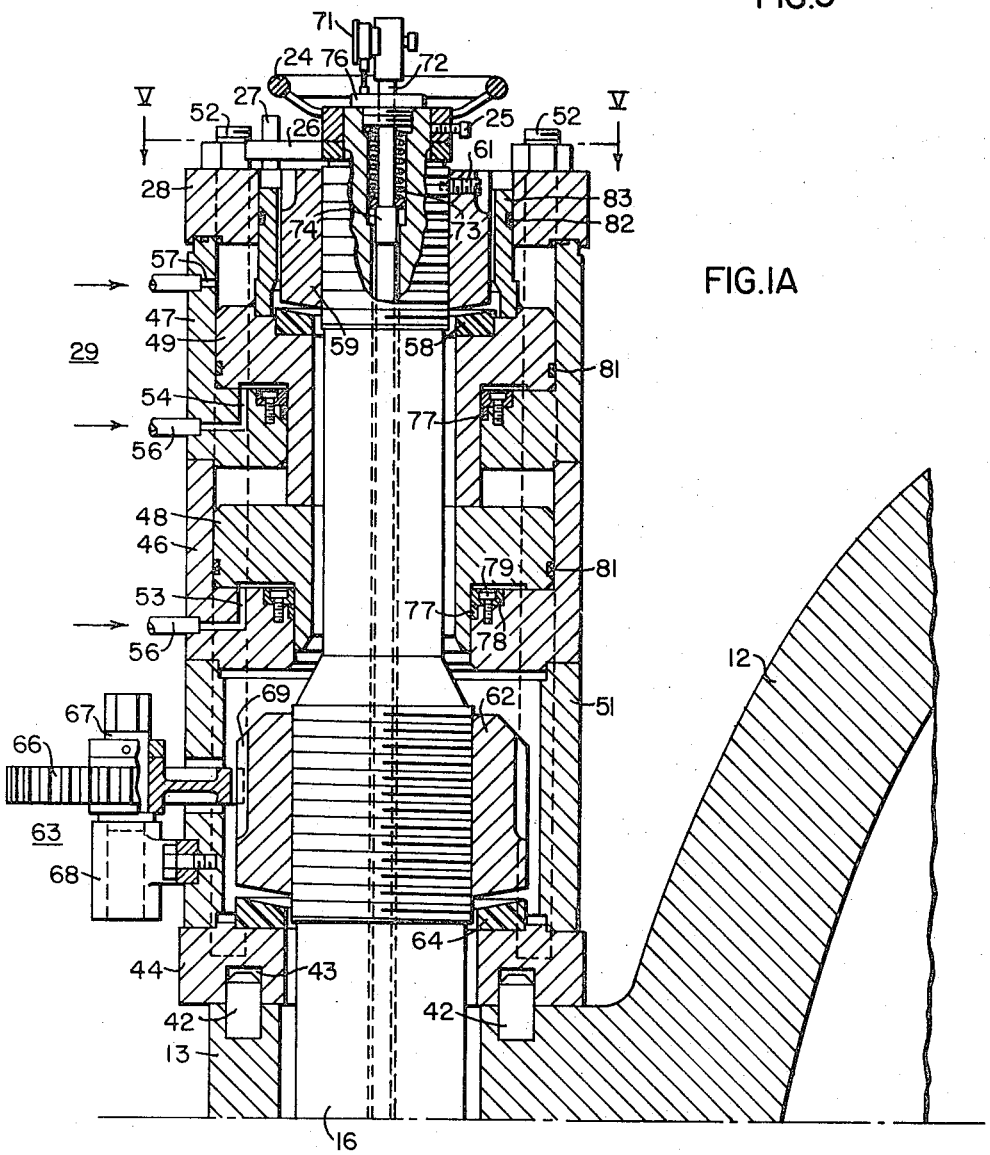
FIGS. 1A and 1B, when joined end-to-end, constitute a sectional view through a portion of a reactor vessel and closure head and one of the holding studs and its tensioning device constructed in accordance with the present invention.
Figure 1B:
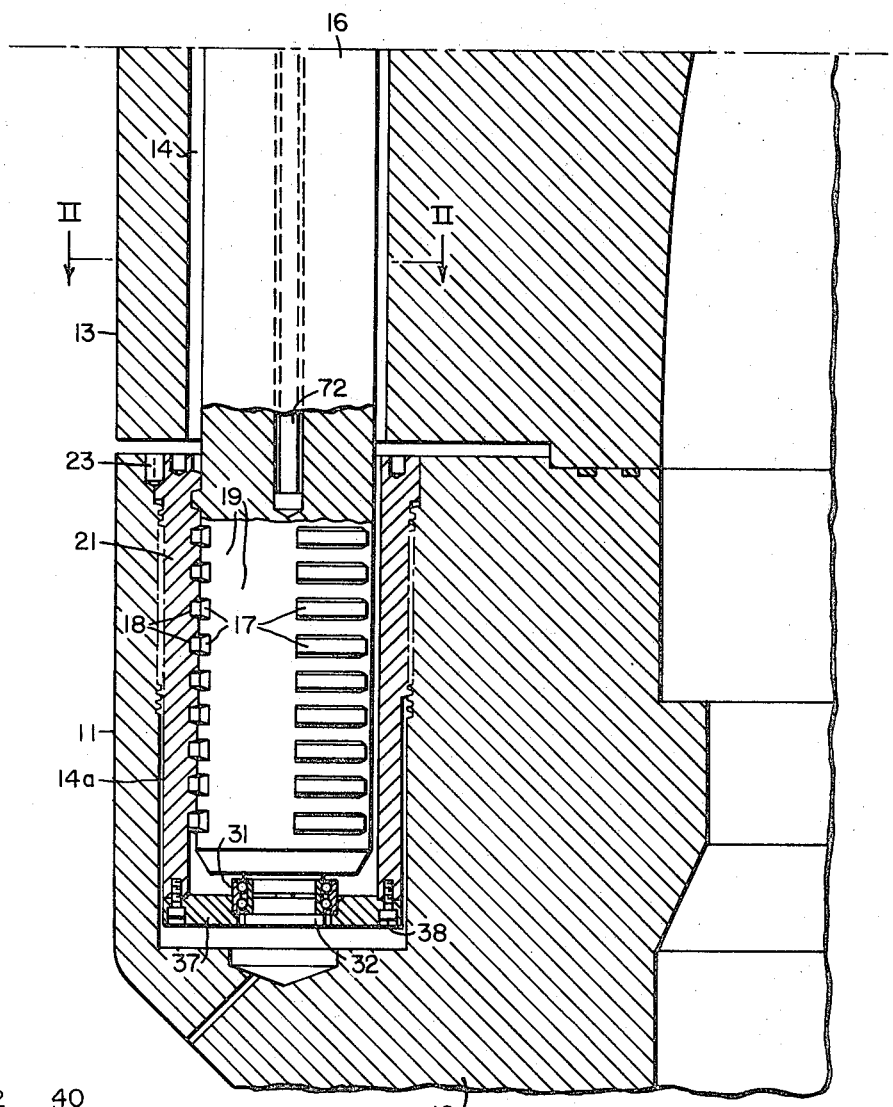

Referring to the drawings, particularly to Figures 1A and 1B, the structure shown therein comprises a portion of a generally cylindrical reactor vessel 10, having an integral outwardly extending flange 11, and a generally hemispherical closure head 12 having an integral outwardly extending flange 13, which mates with the flange 11 on the vessel 10. The vessel 10 may be of a type, well-known in the art, suitable for use in a nuclear power system.

Figure 2:
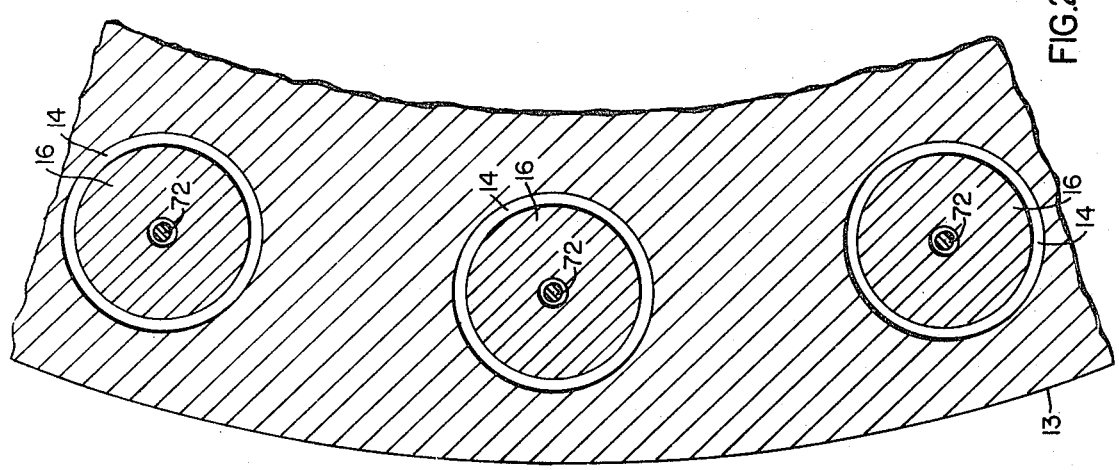
FIG. 2 is a view, in section, taken along the line II—II in FIG. 1B.

As shown more clearly in FIGS. 1B and 2, a plurality of vertically aligned holes 14 and 14a are provided in the flanges 13 and 11, respectively. The holes 14 extend through the flange 13 and the holes 14a terminate in the flange 11. In order to retain the closure head 12 on the vessel 10, holding studs 16 are disposed in the holes 14 and terminate in the holes 14a.

Figure 3:
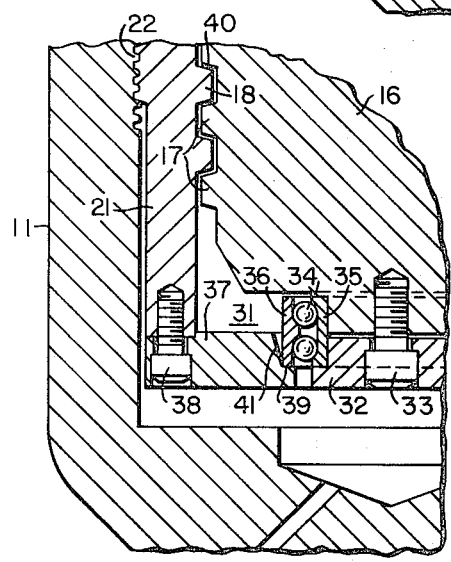
FIG. 3 is an detail view, in vertical section, of a portion of the structure shown in FIG. 1B.
Figure 4:
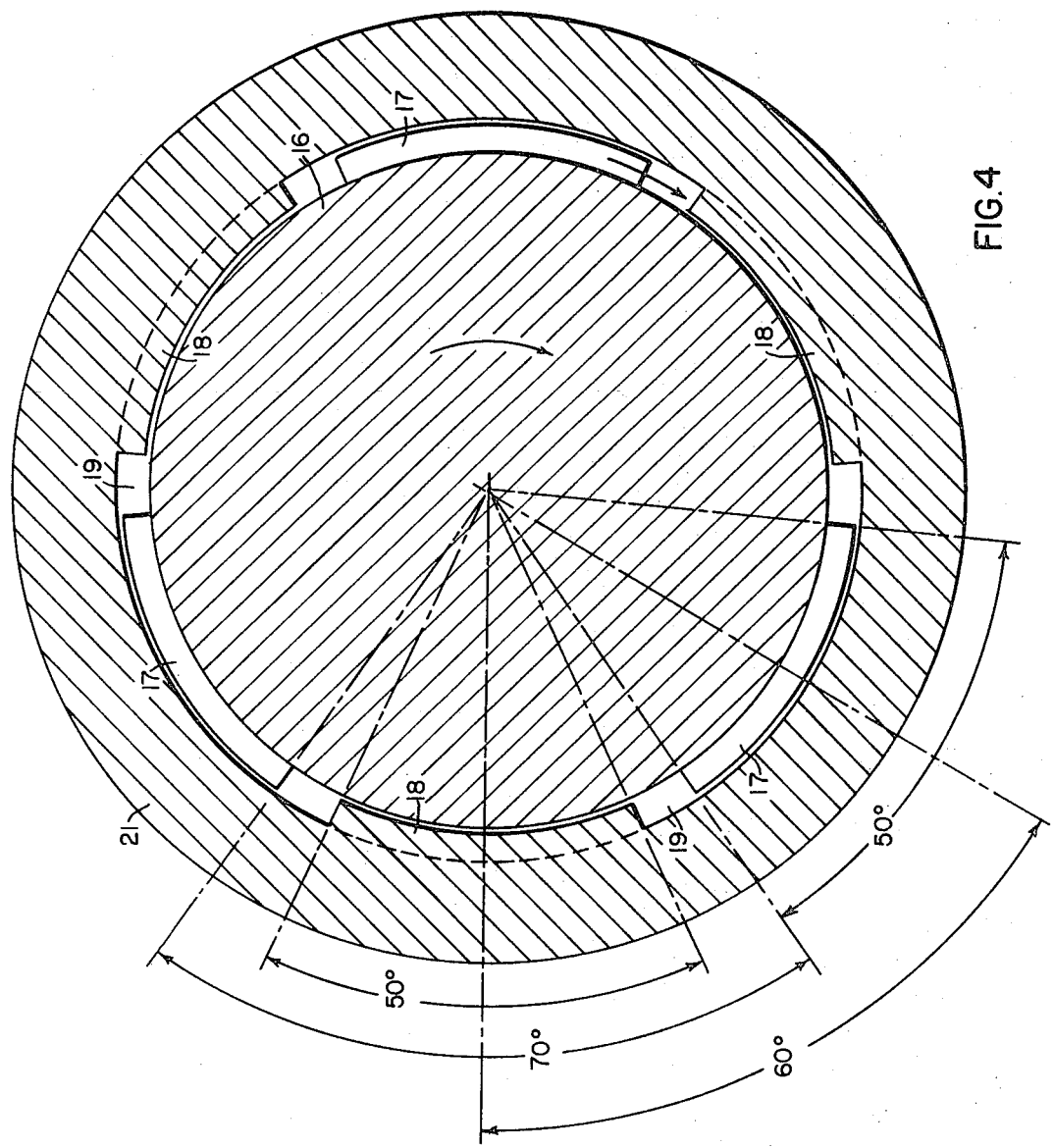
FIG. 4 is an enlarged detail view, in horizontal section, of a holding stud and cooperating bushing shown in FIG. 1B, the stud being in the "clear" position.

The studs 16 are rotatably mounted in the holes and, as shown more clearly in FIGS. 1B and 3, each stud has a plurality of separate parallel horizontally extending interrupted threads 17 at its lower portion. Each hole 14a has corresponding threads 18 in the wall of the hole. The threads are alisgned in vertical sections with gaps 19 between sections having a greater angular extent than the angular extent of the thread section. Thus, as shown in FIG. 4 in which a stud is shown in the "clear" position, the threads extend through an angle of 50° and the gaps extent through an angle of 70° in the structure shown in the present drawings. In this manner, the studs may be rotated through an angle of 60° to align the thread sections on the studs with the thread sections in the vessel flange. As shown in FIG.

4, the thread sections on the stud are aligned with gaps between the thread sections in the flange.

In the present structure, the interrupted threads 17 cut in the lower portion of the stud 16 actually are generated by cutting separate parallel grooves in the stud, rather than a continuous helical groove which is used with standard breechblock threads. This thread structure is provided to prevent any contact with the corresponding threads in the vessel flange when the stud is rotated to the "lock" position.

Because of the extreme difficulty in machining threads of this type directly in the vessel flange, the threads 18 are cut in the inner wall of a separate bushing 21, which, in turn, is attached to the flange 11 by means of regular helical threads 22, which may be produced fairly easily in the flange and on the outer wall of the bushing. As shown more clearly in FIG. 3, the threads 22 are preferably of the Acme type. Each finished bushing 21 is threaded into a hole 14a in the vessel flange 11 to the proper depth and locked in place by an alignment pin 23 so that the interrupted sections of the threads on all bushings assume the same position relative to lines passing through the center lines of the studs and the pressure vessel. In addition to simplifying or even making possible the machining of the threads, the use of bushings has the advantage of permitting the selection of a material that is more suitable for the application than the material of which the vessel is composed, resulting in a reduction of the thread length and the size of the flange. The bushings may be completely plated with a corrosion resistant material, such as nickel or zinc, thereby permitting immersion of the threads in water during the refueling period. As a result, it is not necessary to resort to the use of watertight plugs for sealing the stud holes during the refueling period, which has been standard procedure, thereby saving valuable time. It is also possible to replace a bushing in case of damage to the threads. The utilization of the loose-fitting Acme threads 23 for attaching the bushings to the flange facilitates the replacement of a bushing.

After the studs 16 have been inserted in the bushing holes, they are rotated 60° until thread sections 17 and 18 of the studs and bushings, respectively, overlap. A hand wheel 24 is attached to the upper end of each stud 16 by means of a setscrew 25 to rotate the stud. Correct rotation in either direction is indicated by a pointer 26 attached to the upper end of the stud and by stop pins 27 located on a top plate 28 of a hydraulic tensioning device 29, described more fully hereinafter. The stop pins 27 engage the pointer 26 to limit rotation of the stud in either direction.

In view of the weight of the studs (approximately) 1,800 lbs. each for a 175 inch I.D. vessel), it is desirable to facilitate rotation of these studs by reducing the frictional forces to a minimum. This is accomplished by attaching a thrust bearing 31 to the lower end of each stud by the means of a clamp 32 and a bolt 33. As shown in FIG. 3, the bearing 31 is of the low friction ball type, having balls 34 mounted between an inner race 35 and an outer race 36. A support plate 37, having a circular center hole, is attached to the lower end of the bushing 21 by means of bolts 38. The plate 37 serves as a seat for the thrust bearing 31 when the stud is in the inserted position. The distance from the seat 39 to the bushing threads is such that maximum axial clearance 40 between stud and bushing threads is available in this position. Thus, there is no axial contact between these threads during rotation of the stud. The stud is centered in the bushing by a taper 41 in the hole in the support plate 37. The final clearance between the bearing 31 and the taper 41 is small enough to prevent lateral contact between stud and bushing during rotation. In this manner, each stud may be rotated by means of the hand wheel 24 without great difficulty. However, if desired, a rotary hydraulic actuator may be provided for this purpose.

Figure 5:
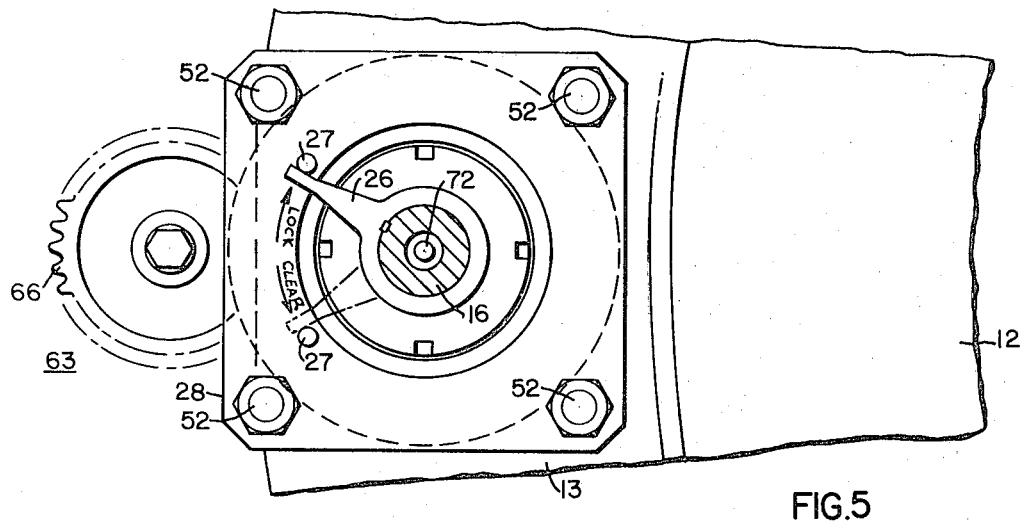
FIG. 5 is a view, in section, taken along the line V—V in FIG. 1A.

In order to obtain the required loading on the studs, the hydraulic tensioning devices 29 are mounted on top of the closure head flange 13. As shown in FIG. 1A, each stud 16 extends continuously upwardly through the device 29 which surrounds the upper portion of the stud. Each tensioning device 29 is positioned on the flange 13 by means of at least two positioning pins 42 with tapered upper ends which enter holes 43 in a base plate 44 of the device 29. Each device 29 comprises two cylinder 46 and 47 and pistons 48 and 49 reciprocally mounted in the cylinders 46 and 47, respectively. The cylinder 46 is mounted on a sleeve 51 which, in turn, is mounted on the base plate 44. The cylinder 47 is mounted on the cylinder 46 and the top plate 28 is mounted on the cylinder 47. The top plate 28 and the base plate 44 are held together by four rods 52, as shown in FIG. 5. Thus, the pistons are mounted in tandem to obtain the required stud loading without exceeding a hydraulic pressure of 10,000 psi.

In order to still further reduce the hydraulic pressure, the upper portion of each stud, which is loaded only temporarily during the tensioning period when the temperature is low, is reduced in diameter to provide more piston area without increasing the diameter of the tensioning device. The hydraulic fluid is introduced under the piston 48 through an opening 53 in the base of the cylinder 46. Likewise, hydraulic fluid is introduced under the piston 49 through an opening 54 in the base of the cylinder 47. The hydraulic fluid may be supplied from a suitable source (not shown) through tubing 56. Hydraulic pressure may also be applied about the upper piston 49 through an opening 57 in the wall of the cylinder 47. In this manner, both pistons may be driven downwardly against any residual pressure under the pistons resulting from possible standpipe effect of the pressurizing equipment. Thus, the stud 16 is permitted to drop downwardly by gravity under certain conditions described hereinafter.

The developed upward thrust is transmitted through a spherical washer 58 to a nut 59 which is fixed on the upper threaded portion of the stud 16. The threaded nut 59 is fixed on the stud by means of a setscrew 61. When the desired hydraulic pressure is reached, an adjustable nut 62, which is free to turn on threads on the full diameter portion of the stud, is lowered by means of a gear drive 63, or by other suitable means, until it is in firm contact with the base plate 44 through a spherical washer 64. When the hydraulic pressure is removed, the stud load is transferred from the fixed nut 59 to the nut 62. The pistons are moved to the lower position by applying hydraulic pressure above the upper piston.

As shown in FIG. 1A, the gear drive 63 comprises a gear 66 secured to a shaft 67 rotatably mounted in a bracket 68 attached to the sleeve 51. The gear 66 engages external elongated teeth 69 on the nut 62. The shaft 67 may be driven by suitable means, such as an air-operated motor or wrench (not shown) applied to the hexagon-shaped end of the shaft.

The acual value of the stud loading may be estimated by a micrometer 71 located on top of each stud which indirectly measures the elongation or strain of the stressed part of the stud by comparing its length with that of an unstressed rod 72 of the same material as the stud and located in a central hole in the stud. As shown in FIG. 1B, the rod 72 terminates at the upper portion of the threads 17 at the lower end of the stud. As shown in FIG. 1A, the rod 72 is biased downwardly by a compression spring 73 extending between a shoulder 74 on the rod and a bushing 76 threaded into the upper end of the stud 16.

As explained hereinbefore, accurate location of the tensioning device 29 on the flange 13 is insured by means of two alignment pins 42. The device may be removed for inspection or repair by a straight upward pull after the stud is detensioned and rotated to the "clear" position.

In preparation for removing the closure head for refueling, hydraulic pressure is applied under the pistons until the load is completely transferred to the fixed nut 59. This frees the adjustable nut 62 which is backed off to its upper position as shown on the drawing. The pressure under the pistons is then removed and pressure is applied above the upper piston, thereby causing unloading of the stud and return of both the stud and the pistons to the lower position as illustrated. The studs are then rotated through 60° to the "clear" position, after which the closure head with the studs in place may be lifted vertically without interference.

On hydraulic devices of the type herein described, special oils are customarily used as the hydraulic fluid and synthetic rubber O-rings serve as piston seals. For the present application, where the devices remain on the reactor vessel during operation and reach a temperature of approximately 600° F, this is no longer feasible. A satisfactory solution is to use water as the fluid and metal piston rings as seals. Water has the additional advantage that any leakage will not contaminate the reactor water.

The substitution of piston rings for O-rings may result in an appreciable increase in the leakage ratio, but by proper construction of the rings and their grooves and by using several rings in series, it is possible to hold the leakage rates within acceptable limits. The water will evaporate when the reactor heats up and must be replenished when the temperature has been reduced preparatory to refueling.

As shown in FIG. 1A, metal seal rings 77 may be retained in the wall of the cylinder 46 by means of a retainer ring 78 attached to the cylinder by screws 79. Metal piston rings 81 may be provided in the pistons 48 and 49 and additional seal rings 77 may be retained in the cylinder 47 in the manner hereinbefore described. Metal seal rings 82 may be provided in a sleeve 83, secured to the top of the piston 49, as by welding.

From the foregoing description, it is apparent that the invention provides a head closure mechanism which enables the time required for head removal and replacement during refueling of a nuclear reactor to be reduced without greatly increasing the size and the cost of the flanges on the closure head and the reactor vessel. The mechanism herein described may be economically manufactured and installed.

We claim:

1. A head closure mechanism for a generally cylindrical reactor vessel and a closure head having outwardly extending mating flanges with a plurality of vertically aligned holes therein, comprising
    studs rotatably disposed in said holes to retain the closure head on the vessel,
    each stud having a plurality of separate parallel horizontally extending interrupted threads at its lower portion,
    each hole in the vessel flange having inwardly projecting corresponding threads in the wall of the hole,
    each of said stud and vessel flange threads being aligned in vertical sections with gaps extending in a circumferential direction between sections,
    each stud being selectively rotatable to align the thread sections on the stud with the thread sections in the vessel flange to thereby position said threads in interlocking engagement with each other,
    stud tensioning means engageable with each stud which is selectively operable to place each stud in tension after said stud and vessel flange threads are placed in interlocking relationship with each other; and
    means on each stud axially movable into contact with a member on the closure head when the stud is in tension so that when the load imparted to the stud by the stud tensioning means is released, the axially movable means on said stud absorbs the load thereby firmly locking said closure head on the reactor vessel.

2. The mechanism defined in claim 1, including stop means mounted on the closure head for limiting the rotation of each stud to thereby indicate when the stud is in interlocking engagement with threads on the closure vessel.

3. The mechanism defined in claim 1, including means on each stud for rotating the stud threads into interlocking relationship with the vessel threads; and indicating means on each stud for showing the degree of elongation of each stud when it is placed in tension.

4. The mechanism defined in claim 1 wherein the upper portion of each stud is reduced in diameter, and said stud means includes at least one hydraulically actuated piston surrounding the reduced diameter portion of the stud.

5. The mechanism according to claim 4 wherein each stud tensioning means includes a fixed member on the reduced diameter portion of the stud for transmitting thrust from the piston to the stud, and
    an adjustable member on the full diameter portion of the stud engageable with said closure head to which the stud load is transferred when the hydraulic pressure is removed from said piston.

6. The mechanism according to claim 5, including mechanical means supported by the closure head for actuating the adjustable member.

7. The mechanism according to claim 1 wherein a separate bushing is threaded into each hole in the vessel flange, each bushing having inwardly projecting threads on its inner wall corresponding to the threads on the stud, and means for locking the bushing in place in the vessel flange.

8. The mechanism defined in claim 1, including a low friction thrust bearing disposed at the lower end of each stud.

9. The mechanism defined in claim 8, including means for positioning the thrust bearing in each hole in the vessel flange to provide axial clearance between the threads on the stud and the threads in the vessel flange when the stud is unloaded.

10. The mechanism according to claim 1 wherein the stud tensioning means comprises a device mounted on said closure head flange, said device including means on each stud engageable by a load transmitting member in the device which acts to selectively place the stud in tension.

11. The mechanism according to claim 10 wherein the means on each stud comprises a nut threaded on the upper end of the stud; and said load transmitting member in the device comprises hydraulic means selectively movable into contact with said nut to place said stud in tension.

12. The mechanism according to claim 1 wherein the means on each stud axially movable into contact with a member on the closure head when the stud is in tension comprises an axially movable nut threaded on the stud; and selectively operable means mounted on said closure head engageable with said nut to rotate it into contact with said member on the closure head.

* * * * *